(12) United States Patent
Bruno et al.

(10) Patent No.: US 9,852,457 B2
(45) Date of Patent: Dec. 26, 2017

(54) METHOD AND SYSTEM TO FACILITATE TRANSACTIONS BETWEEN ORGANIZATION REGISTRANTS AND MERCHANDISE SUPPLIERS

(75) Inventors: Anthony P. Bruno, Queensbury, NY (US); John F. Haller, Loundonville, NY (US)

(73) Assignee: League Sports Services LLC, Saratoga Springs, NY (US)

( * ) Notice: Subject to any disclaimer, the term of this patent is extended or adjusted under 35 U.S.C. 154(b) by 1200 days.

(21) Appl. No.: 13/273,661

(22) Filed: Oct. 14, 2011

(65) Prior Publication Data

US 2012/0095874 A1    Apr. 19, 2012

Related U.S. Application Data

(60) Provisional application No. 61/393,578, filed on Oct. 15, 2010.

(51) Int. Cl.
*G06Q 30/06* (2012.01)
*G06Q 40/02* (2012.01)

(52) U.S. Cl.
CPC ......... *G06Q 30/06* (2013.01); *G06Q 30/0613* (2013.01); *G06Q 40/02* (2013.01)

(58) Field of Classification Search
CPC ........... G06Q 30/0623; G06Q 30/0639; G06Q 20/32; G06Q 30/0601; G06Q 30/0631
USPC ................ 705/26.1, 27.1, 26.5, 26.81, 26.41
See application file for complete search history.

(56) References Cited

U.S. PATENT DOCUMENTS

| | | |
|---|---|---|
| 7,319,987 B1 | 1/2008 | Hoffman et al. |
| 7,590,561 B2 | 9/2009 | Silverbrook et al. |
| 7,593,871 B1 | 9/2009 | Mesaros |
| 7,610,233 B1 | 10/2009 | Leong et al. |
| 7,647,252 B2 | 1/2010 | Rampell et al. |
| 7,647,253 B1 | 1/2010 | Yeung |
| 8,359,244 B1 * | 1/2013 | Fukuya ............... G06Q 10/06 705/26.41 |
| 8,639,585 B2 * | 1/2014 | Paul ................... G06Q 30/06 705/26.5 |
| 8,788,365 B2 * | 7/2014 | Paul ................... G06Q 30/02 705/26.1 |
| 9,087,355 B2 * | 7/2015 | Ohiaeri ............ G06Q 30/0603 |
| 2002/0040352 A1 | 4/2002 | McCormick |
| 2002/0120537 A1 | 8/2002 | Morea et al. |
| 2003/0089770 A1 | 5/2003 | Veeneman |
| 2004/0020982 A1 | 2/2004 | Hoffman et al. |

(Continued)

OTHER PUBLICATIONS

Nayak, Nitin et al., Virtual Enterprises-Building Blocks for Dynamic e-Business, Proceedings Workshop on Information Technology for Virtual Enterprises, ITVE 2001, pp. 80-87.*

*Primary Examiner* — Alexis Casey
(74) *Attorney, Agent, or Firm* — Matthew M. Hulihan; Heslin Rothenberg Farley & Mesiti PC (57) ABSTRACT

A registration system receives a registration to participate with an organization and a merchandise purchase order from a participant. The registration and merchandise order is processed in a single shopping cart transaction by the organization. Provision of merchandise and order fulfillment is performed by a merchandise supplier of the merchandise that ships the merchandise ordered directly to the participant. Merchandise supplier is compensated through a separate agreement with the organization.

9 Claims, 7 Drawing Sheets

(56) References Cited

U.S. PATENT DOCUMENTS

| | | |
|---|---|---|
| 2004/0193489 A1 | 9/2004 | Boyd et al. |
| 2005/0177728 A1 | 8/2005 | Silverbrook et al. |
| 2007/0192215 A1 | 8/2007 | Taylor et al. |
| 2007/0233615 A1 | 10/2007 | Tumminaro |
| 2007/0250919 A1 | 10/2007 | Shull et al. |
| 2007/0255620 A1 | 11/2007 | Tumminaro et al. |
| 2007/0279262 A1 | 12/2007 | Aydar et al. |
| 2008/0004992 A1 | 1/2008 | King et al. |
| 2008/0262925 A1 | 10/2008 | Kim et al. |
| 2008/0281684 A1* | 11/2008 | Stefanik ............. G06Q 30/0234 705/14.34 |
| 2008/0301009 A1 | 12/2008 | Plaster et al. |
| 2009/0177714 A1 | 7/2009 | Obermeyer et al. |
| 2009/0281890 A1 | 11/2009 | Aliabadi et al. |
| 2009/0281927 A1 | 11/2009 | Aliabadi et al. |
| 2009/0307145 A1 | 12/2009 | Mesaros |
| 2009/0313109 A1 | 12/2009 | Bous et al. |
| 2010/0121739 A1* | 5/2010 | McCarthy ....................... 705/27 |
| 2010/0153160 A1* | 6/2010 | Bezemer ................ G06Q 10/06 705/7.12 |
| 2010/0179905 A1* | 7/2010 | Alasti et al. .................... 705/39 |
| 2010/0250407 A1* | 9/2010 | Silva ............................... 705/30 |

\* cited by examiner

METHOD AND SYSTEM TO FACILITATE TRANSACTIONS BETWEEN ORGANIZATION REGISTRANTS AND MERCHANDISE SUPPLIERS

BACKGROUND

This invention relates, in general, to facilitating transactions, and in particular, to facilitating transactions between registrants of an organization and merchandise suppliers.

With growth in popularity of technology, including computers, comes expanded and novel capabilities of handling transactions. Computer systems are increasingly being used to perform transactions between one or more entities and, for instance, across computer networks including the internet. One example of the way in which computer systems facilitate transactions involves an organization affiliating itself with a web-space wherein potential participants of the organization may register themselves for participation with the organization. For example, sports organizations often utilize computerized registration systems whereby people may register themselves as part of the organization over the internet.

When customers or participants register as a member of an organization, such as an athletic club or team, the registrant and/or participant may wish to purchase merchandise for use during the organizations activities. For example, the registrant may register as a member of a team and wish to purchase a team uniform, or other related merchandise. No system presently exists that enables a registrant of an organization, such as an athletic club, to both register online for participation with activities of an organization, and to simultaneously make a purchase of merchandise, such as team apparel, from a merchandise supplier, wherein the registration and merchandise order is processed as a single shopping cart transaction in which full payment is received by the organization.

BRIEF SUMMARY

The shortcomings of the prior art are overcome and additional advantages are provided through the provision of a method, system, and computer program product to facilitate transactions between participants registering with an organization and merchandise suppliers, who are different entities than the organization.

For instance, the method includes registering a participant for participation in one or more activities of an organization. The method may comprise providing a registration system having registration and merchandise purchase capabilities operable over an internet communications link, registering a participant of the organization and into a computer database of the registration system to create a registration of the participant, and ordering merchandise by the participant from a merchandise supplier, while the registering is performed, to create a merchandise order. The merchandise supplier may be a different entity than the organization, and the registering and ordering is performed in a single shopping cart transaction within said registration system. Further, the method may include processing, by the registration system, the single shopping cart transaction comprising the registration and the merchandise order, receiving payment information from the participant for participation in the one or more organization activities and the merchandise purchase, providing the payment information to a 3rd-party merchant processing facility of the organization for crediting an account of the organization for the registration and merchandise purchase, and relaying merchandise order information to a merchandise supplier for merchandise purchase order fulfillment.

Systems relating to one or more aspects of the present invention are also described and claimed herein.

Further, computer program products relating to one or more aspects of the present invention are also described and claimed herein. A computer program product may be embodied in one or more computer readable medium(s) having computer readable program code embodied thereon for performing a method. The method may include, for instance, the method as described above and throughout the specification.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided for facilitating transactions between organization registrants, including members and/or participants, and merchandise suppliers. A registration system facilitates or provides registration and merchandise purchase capabilities over the internet to a registrant or a participant of an organization. The registrant may access the registration system over the internet, for example, to perform a registration process that includes registering a participant within the organization and ordering merchandise from a merchandise supplier via the registration system.

The organization may be one of numerous different types of organizations. For instance, the organization may comprise an athletic club. A non-exhaustive list of examples of athletic clubs includes a football, baseball, basketball, softball, hockey, golf, tennis, lacrosse, wrestling, or swimming club, or any other type of athletic organization. It may be a scholastic organization, for example a scholastic athletic organization, or other type of extracurricular club or team that is affiliated with a school or other institution-of-learning. Alternatively, it could be, for instance, a professional or amateur sports organization, or a recreational club or organization, such as, but not limited to, a town or other geographic-oriented recreational sports league. The organization need not, however, be an athletic team or league, but could comprise, for instance, a golf country club or even a non-sports-oriented club, for instance any organization in which members become affiliated with the organization to participate in activities sponsored, organized, administered, or facilitated by the organization. Thus, an organization can, in one example, be an organization having a primary purpose of facilitating organization of its members/participants into one or more groups as participants in recreational activities.

The merchandise may be, for example, used for or related to the organization and/or its recreational activities. For example, merchandise relating to the club or organization may be specific to the organization. For instance, merchandise may include anything with a team or organization logo, slogan, or name, including such items as a team uniform or other team or club-related apparel, memorabilia, equipment, or similar items that may be uniquely tailored to the organization. If the organization comprises a baseball little league, for example, the merchandise may include uniforms for participants of the team, and may include the league and/or team name printed or displayed on the uniforms. The invention provides, in part, that the merchandise items may be ordered by the registrant at the time of registering, and as part of a single shopping car transaction.

A registrant refers to a person who registers a participant within the athletic organization, or who accesses a registration system to update information relating to a participant. The participant may be a person who will become a member of the organization or who will participate in an event or activity sponsored by or affiliated with the organization. A registrant may be the participant for whom the registration is being performed, or the registrant may be a person representing the participant such as a parent, relative or guardian. A merchandise supplier may be one or more suppliers of merchandise useable by participants within the organization. A registration system includes a computer system with associated code including programs and databases to facilitate registration of participants within the organization and processing of orders of merchandise of the registrants from one or more merchandise suppliers. The registration system may maintain a database of information relating to the organization and its members. For example, the registration system for an athletic club may include a database of the members of the athletic club including each member's name, address and other contact information, emergency contact information, parent or guardian information, medical information, financial information including payments made to the athletic club, as well as team information including the team for which the member has been assigned to. Other information relating to the athletic club and/or its members may be maintained within the registration system. The registration system also facilitates the input and recording of this information from each registrant.

A shopping cart transaction generally refers to an electronic business transaction which occurs over a communication link such as via, for example, the internet whereby a purchaser is capable of designating multiple items for purchase and then purchase such items in a single electronic transaction initiated by the purchaser typically via the purchaser's computer and/or other communication device. For example, purchasers of goods over the internet may purchase multiple goods in a single shopping cart transaction by accessing one or more web pages which offers various items for sale. The user may designate items to be purchased by indicating the desire to purchase such goods. The goods may then be placed in a virtual shopping cart so that the purchaser can browse for other goods and determine whether or not to include any other goods within the shopping cart. When the user has finished browsing for goods, it may pay for the multiple goods within its virtual shopping cart in a single electronic transaction initiated by the purchaser. Such a transaction is typically accomplished after the electronic shopping cart calculates the total price for the goods and possibly other incidental charges such as sales tax and/or shipping costs and the user inputs its payment information such as its credit card or other payment information. The purchasing program implemented via the website then processes the single payment transaction to pay for the multiple goods within the shopping cart.

In accordance with the present invention, the registrant may access the organization's registration system via a website over a communications link. While accessing the registration system, the registrant may order merchandise related to the organization via the registration system and the web domain. The registrant may order one or more items of a merchandise supplier in a single shopping cart transaction. In addition, the registrant may also register a participant with the organization and order one or more merchandise items of a merchandise supplier whereby the registration and ordering of merchandise are accomplished in a single shopping cart transaction. Accordingly, payment information for the merchandise as well as payment and/or other information relating to the registration may be processed in a single transaction initiated by the registrant. In accordance with an aspect of the invention, registration may include registering the participant as a member of the organization and/or registering the participant within a specific event sponsored by or affiliated with the organization. For example, the participant may register as a member of an athletic club, or the participant may register as a member of one of the teams or participants of an event of the athletic club.

Figure 1:
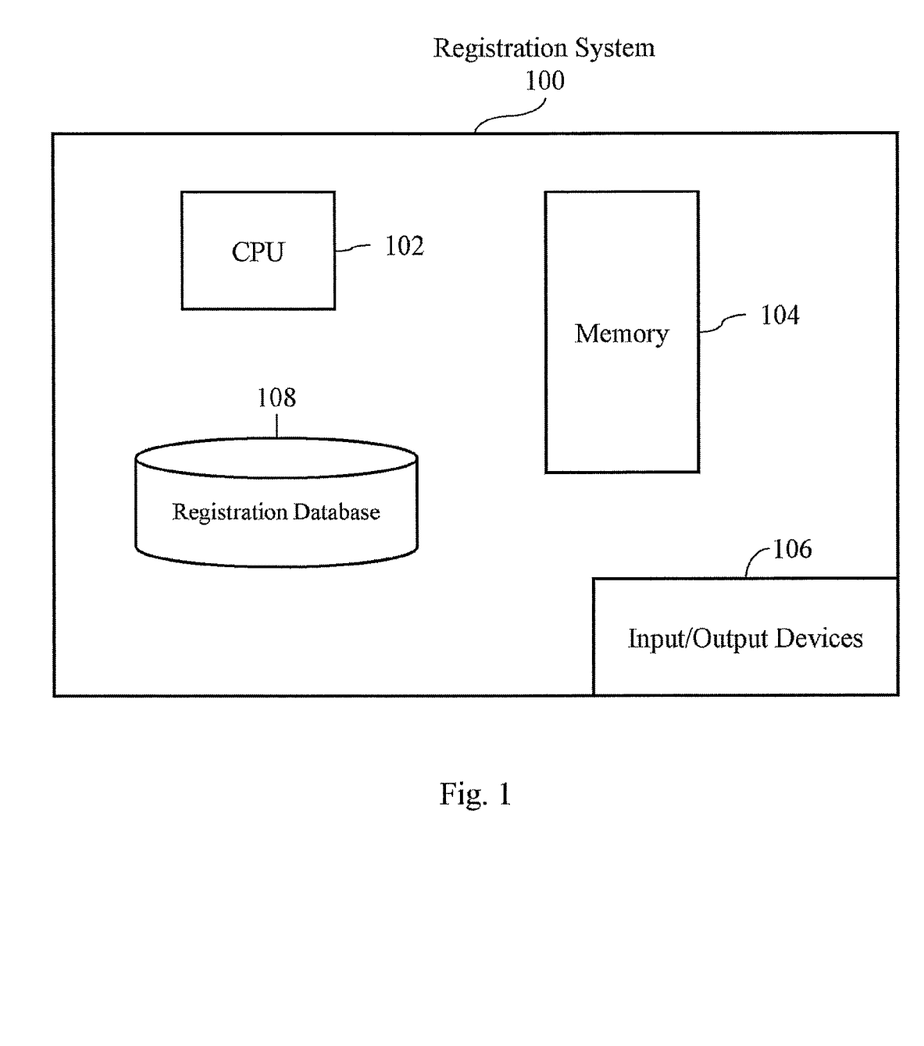
FIG. 1 depicts a schematic representation of one embodiment of a registration system, in accordance with an aspect of the present invention.

One embodiment of a registration system to incorporate and perform one or more aspects of the present invention is described with reference to FIG. 1. In this example, the registration system 100 includes a native processor 102 (e.g., central processing unit (CPU)), a memory 104, one or more input/output (I/O) devices 106, and a registration database 108. I/O devices 106 may be used by the registration system to communicate with one or more computer systems across a communications link. One non-limiting example of a communications link, as used in this specification, may comprise one or more digital or analog connections operating via wired or wireless technology to facilitate communication with another system. As an example, the communications links may be any type of network connection such as a local area network (LAN), a wide area network (WAN), a token ring, an Ethernet connection, etc. In one embodiment, the registration system utilizes I/O devices 106 to communicate with a registrant of an organization to perform registration and merchandise ordering. The registration system may further utilize I/O devices 106 to communicate with an organization with which the registrant registers, and a merchandise supplier. The registration system may communicate with one or more registrants, organizations, and/or merchandise suppliers to collectively form a communications environment as described with reference to FIG. 2. The registration system functions to process requests for registrants to register a participant within, e.g., as a member of, the organization, and/or, for example, as a participant of a club, team or event sponsored by the organization.

Figure 2:
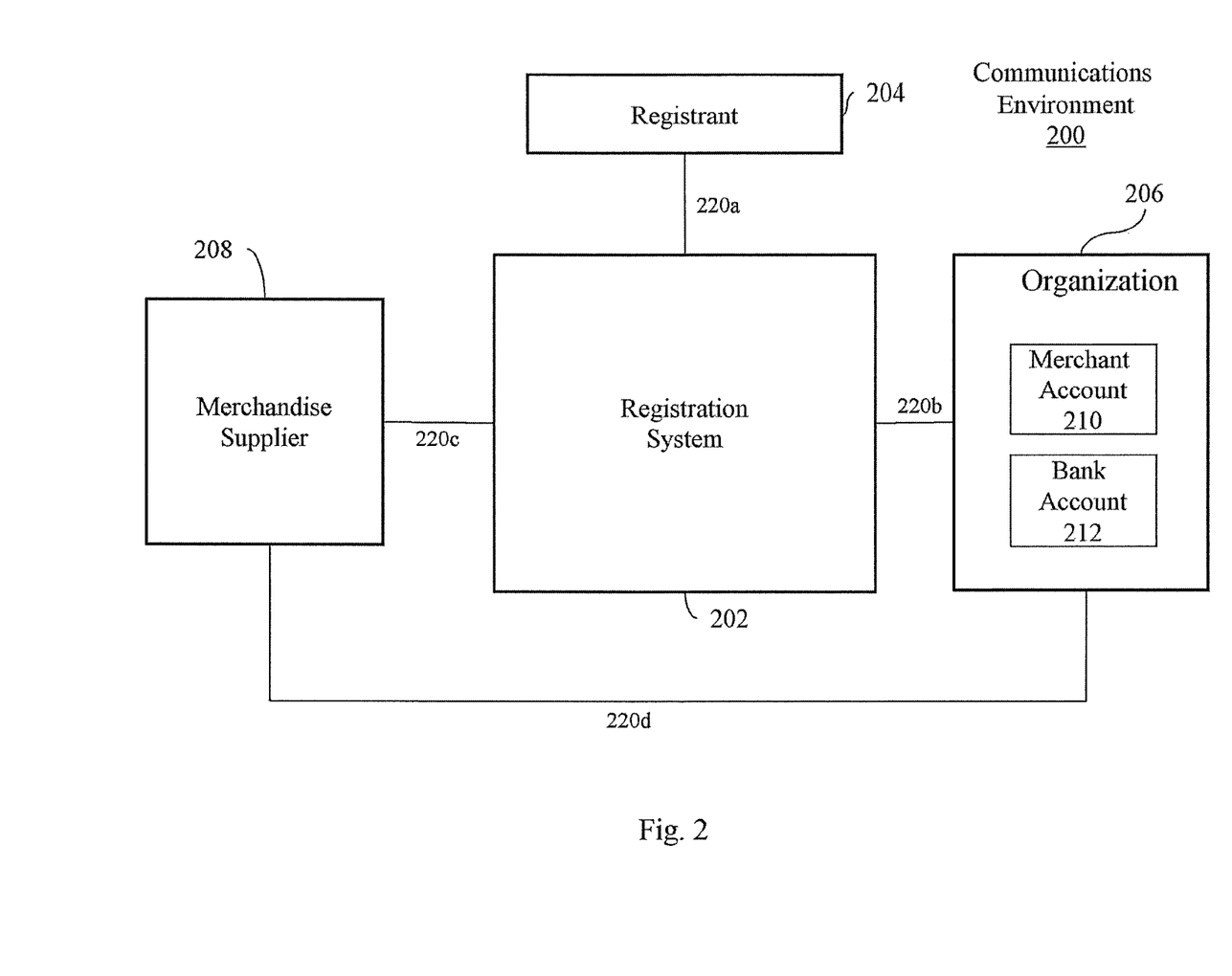
FIG. 2 depicts a schematic representation of one embodiment of a communications environment to incorporate and use one or more aspects of the present invention.

FIG. 2 depicts one embodiment of a communications environment 200 to incorporate and use one or more aspects of the present invention. A registration system 202 is depicted therein. As an example, the registration system 202 could be the registration system 100 associated with an organization such as an athletic club, as described with reference to FIG. 1. Registration system 202 is in communication with a registrant 204, e.g., someone registering a club or prospective club participant, via a communications link 220a. As an example, the registrant 204 may be a person desiring to register a participant for participation with an organization such as an athletic club or team thereof, and who may utilize a computer system to facilitate communication with the registration system 202 via communications link 220a. Registration system 202 is also in communication with an organization 206, e.g., the athletic club, via communications link 220b. This communication also may be facilitated by a computer system, for instance a computer system of the organization 206 to communicate with the registration system 202 via communications link 220b.

Depicted within organization 206 is a merchant account 210 associated with the organization 206, and a bank account 212 associated with the organization 206. Merchant account 210 represents a merchant processing facility for processing payment transactions. Bank account 212 represents a bank account associated with the organization. Merchant account 210 and bank account 212 are depicted within organization 206 to illustrate the relationship to the organization, but it should be appreciated that the merchant account 210 and bank account 212 facilities may be present within or without the organization. For example, the merchant account 210 may be a 3rd-party merchant processing facility operating independent of the organization. Additionally, although the merchant account 210 and bank account 212 are depicted as separate entities, they may alternatively be part of a single entity.

Together, the registration system 202, registrant 204, and organization 206 may communicate to effect a registration of the participant for participation with the organization 206. This participation may extend beyond the mere communication taking place as described with reference to FIG. 2 above. For instance, the participation may extend to a relationship formed between the participant, for example, club or team member or participant, and the organization, for example, the athletic club, comprising participation in various activities, for example, team membership or specific team events such as games, in which the organization (including the teams therein) engages.

Figure 3A:
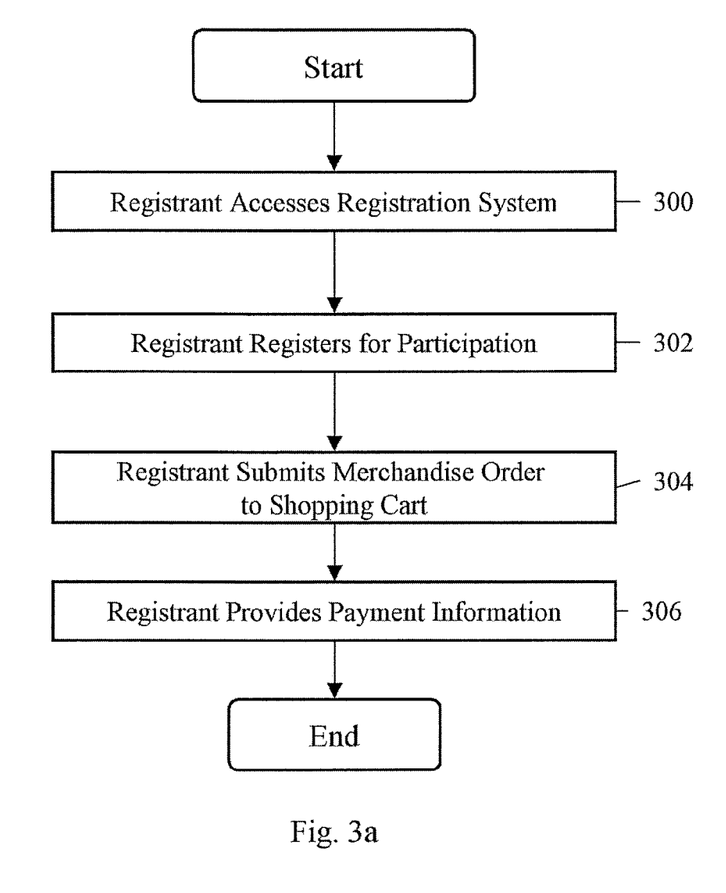
FIG. 3a is a flowchart of one embodiment of a method of registering and ordering merchandise by a registrant using the registration system, in accordance with an aspect of the present invention.
Figure 3B:
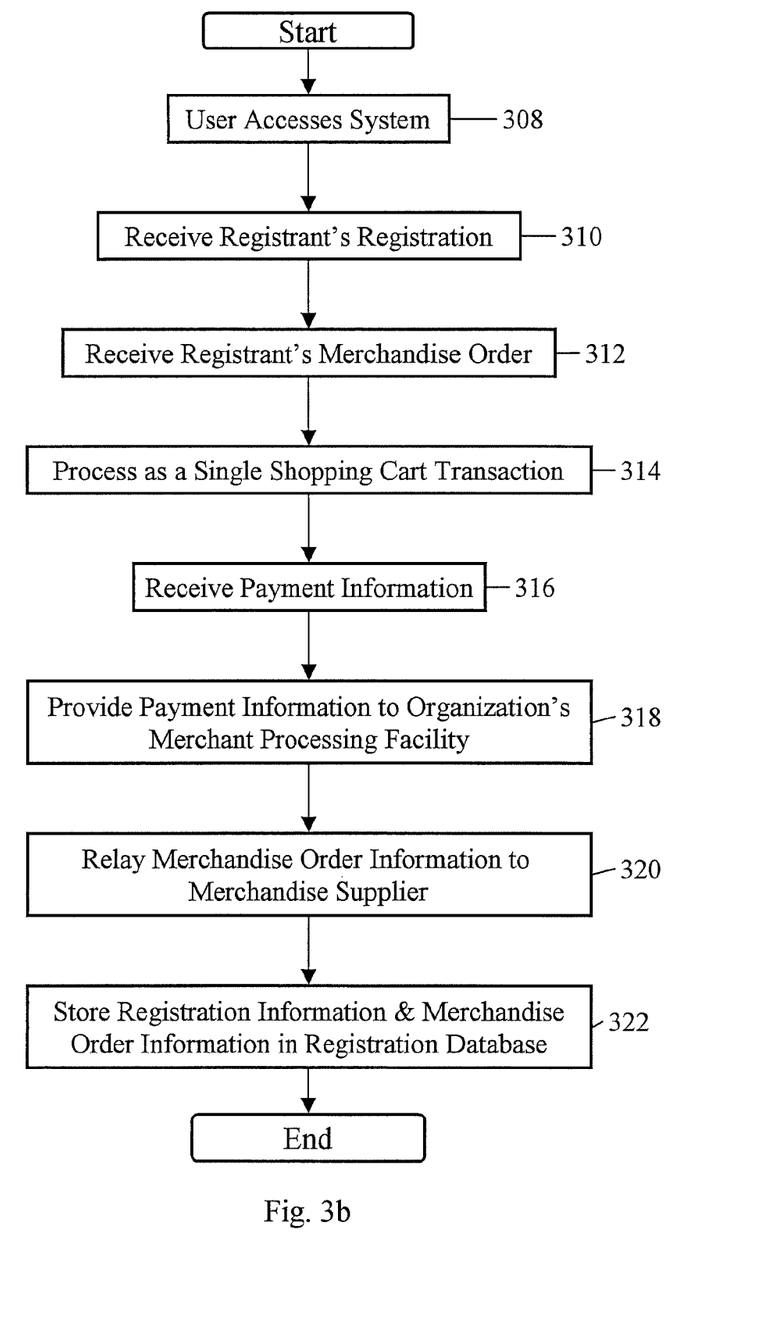
FIG. 3b is a flowchart of one embodiment of a method of the registration system for registering and ordering merchandise by a registrant using the registration system, in accordance with an aspect of the present invention

As an example, the organization may comprise a club, recreational, or athletic organization and the participant may comprise a participant on a group or team of the club or athletic organization. The registrant may thus, in one example, communicate with the registration system to register the participant for participation with the athletic organization and/or a team of the athletic organization. In this example, a relationship is formed via the registration in which the participant participates on an athletic team and in athletic events coordinated by the athletic organization. Additionally, in one embodiment, registration comprises providing payment information to pay a fee for participation with the organization. The registration system may communicate with the athletic organization, or a merchant account of the athletic organization, to facilitate payment of registration fees of the participant to participate with the organization, for instance on a team or in a specific team event such as, for example, a team tournament, trip, etc. Further details of the communication between registrant 204 and the registration system 202 are provided in a discussion with reference to FIGS. 3a and 3b, below.

Continuing with the description of FIG. 2, registration system 202 may further be in communication with one or more merchandise supplier(s) 208 via communications link 220c. Communications link 220c may be used by a merchandise supplier 208 to, for example, update merchandise information in the registration system 202. In one embodiment, merchandise supplier 208 may transmit one or more product data feeds, including real time data feeds, to the registration system to provide current information about merchandise offered by the merchandise supplier 208. In one embodiment, the registration system may be provided and/or maintained by the merchandise supplier itself. In another embodiment, the registration system may be provided and/or maintained by a registration provider, such as League Sports Services LLC of Latham, N.Y., and the merchandise supplier may be a 3rd-party merchandise supplier.

Merchandise supplier 208 may be utilized by the registration system 202 to provide merchandise purchase opportunities to registrants 204 communicating with the registration system. Merchandise made available to registrants 204 by the registration system 202 may correspond to particular activities of the organization 206 with which registrants seek to register participants. The merchandise presented to registrants for use by participants may be pre-selected by the organization, the merchandise supplier, or another entity. For example, if the organization is an athletic club, such as a soccer club, and the participants are players for registration within the club and/or teams within the club, the merchandise supplier may be a soccer uniform or apparel retailer who offers the club and/or team's uniform via the registration system 202. Additionally, the merchandise presented may be tailored specifically to the particular club or organization. For example, the merchandise may include an organization and/or team logo, slogan, or uniquely-identifying mark or marks. Alternatively or additionally, the merchandise may be tailored to the particular participant of the organization, for instance, by including a name or particular uniform number of the participant.

Using the example above, a registrant 204 may seek to register a participant for participation on a team as a player of an athletic organization 206, in which case merchandise supplier 208 may supply athletic equipment such as the uniform designated for that team. For instance, merchandise supplier 208 may offer athletic merchandise including, but not limited to, team uniforms, personal and team equipment, and team memorabilia. Thus, in one embodiment, the merchandise presented to registrants 204 as being available for purchase may be tailored according the particular league or team with which the participant seeks to register. Alternatively, the merchandise presented to registrant may include any merchandise offered by any merchandise supplier affiliated with the registration system, regardless of the activity or organization with which the participant 204 seeks to register.

Communications link 220c between merchandise supplier 208 and registration system 202 may be additionally used to transmit order information from the registration system 202 to the merchandise supplier 208 for facilitating order fulfillment, such as is described below with reference to FIG. 4. In one embodiment, a registrant orders merchandise via the registration system, and the registration system transmits a list of the merchandise ordered to enable the merchandise supplier to identify and ship the merchandise directly to the participant. In the example above, a registrant registering a participant for participation with an athletic team may browse a storefront associated with the merchandise supplier such as a uniform supplier, place an order for athletic equipment, such as a uniform, and the registration system may forward order information to the merchandise supplier for shipment of the athletic equipment, e.g., the uniform, to the participant.

Figure 5:
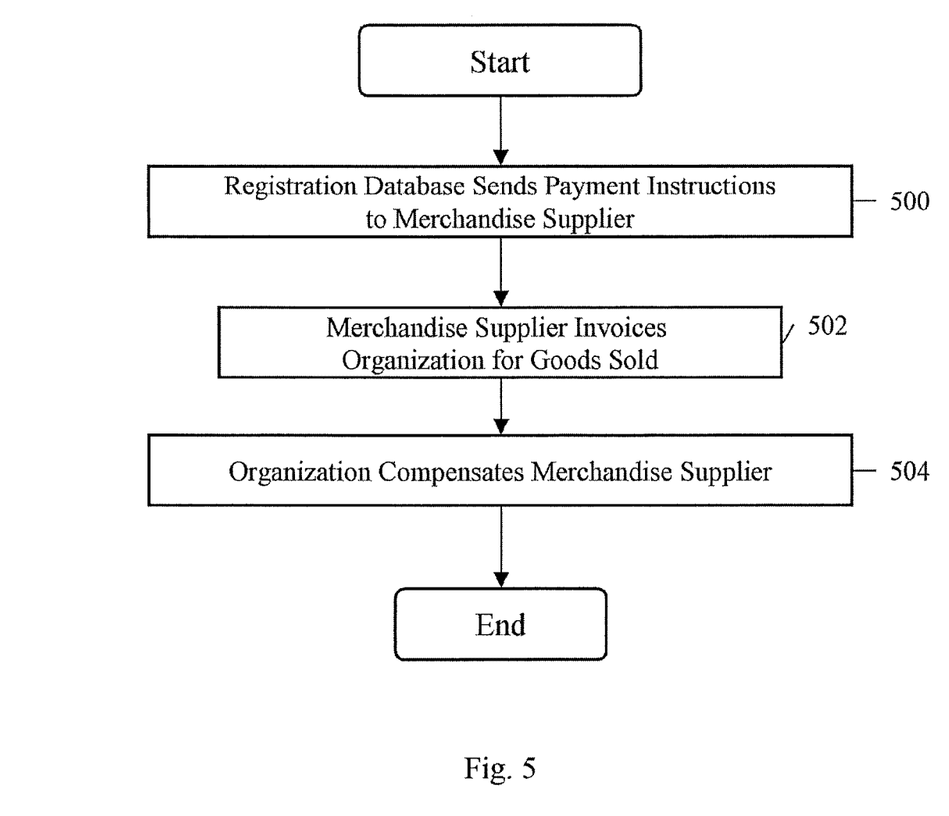
FIG. 5 is a flowchart of one embodiment of a method through which merchandise suppliers are compensated, in accordance with an aspect of the present invention.

As shown in FIG. 2, merchandise supplier may also be in communication with the organization 206 via communications link 220d. In one embodiment, communications link 220d may be used to facilitate compensation to the merchandise supplier by the organization, such as is described below with reference to FIG. 5.

In accordance with an aspect of the present invention, a registrant uses the registration system to register a participant for participation in one or more activities of an organization and order merchandise while the registering is performed. This process is described with reference to FIG. 3a, from the perspective of the registrant. Registrant begins by accessing the registration system, STEP 300 via a computer or other communication device. The computer or other communication device transmits information via a communications link, for example, the internet. As described above, this accessing by the participant may be facilitated by a computer system or other communication device such as a smartphone, for example. Registrant then interacts with the registration system to register a participant for participation in one or more activities of the organization, STEP 302. For example, the participant may be registered as a member or player within an athletic club. At the time of registering, registrant also browses and selects merchandise to purchase, such as a uniform, and submits a merchandise order to the system, STEP 304. Lastly, the registrant provides payment information, STEP 306, such as credit card information to pay for the registration and merchandise.

In accordance with an aspect of the present invention, a registration system is provided to facilitate registering of participants with an organization and a merchandise purchase as part of a single transaction. The processing of the registration system to facilitate the single transaction is described with reference to FIG. 3b. At STEP 308, a registrant accesses the registration system, for instance via a communications link between the registrant and the registration system. Such a link may provide an internet connection between the registration system and the registrant's computer or other communication device. The registration system receives a participant registration from the registrant, STEP 310, to register the participant for participation in one or more activities of the organization. At STEP 312, the registration system receives a registrant merchandise order. At STEP 314, the registration system processes the participant registration and merchandise order into a single shopping cart transaction. The registration system then receives payment information from the registrant, STEP 316. The payment information comprises information enabling a system to receive compensation from the registrant for the single shopping cart transaction. This payment information, once received by the registration system, is provided to the organization's merchant processing facility, STEP 318. Also, the merchandise order information may be relayed to a merchandise supplier, STEP 320, for processing by the merchandise supplier. The merchandise order information may be processed by a merchandise supplier as part of an order fulfillment process, as is described below with reference to FIG. 4. The registration information and/or merchandise order information may then be stored in a registration database of the registration system, STEP 322.

With regard to the interaction between the registrant and registration system as described above, it should be noted that a period of time may intervene between the initiating registration for participation with the organization and the processing of a transaction comprising a registration and merchandise order. For example, a registrant may access the registration system and initiate the registration process, then complete the balance of the registration process and the merchandise order process at a later time, which is then followed by the registration system completing the single shopping cart transaction. One example of such a situation is the situation in which a participant submits registration information, which is saved in the registration system, but which is incomplete for purposes of completing the registration. The registrant may return, for instance at a later time, to complete the registration and place a merchandise order. The registration and merchandise order may then be processed by the registration system as part of a single merchandise transaction (i.e. FIG. 3b, STEP 314), and the process can continue as described above.

It should additionally be appreciated that the registration system may subsequently be used by the registrant, having already registered a participant for participant and may or may not having already placed an initial merchandise order, to place a subsequent merchandise order wherein the registrant accesses the registration system and places another or a first merchandise order, which is processed as a shopping cart transaction by the registration system, and which payment is processed and received by the organization.

Figure 4:
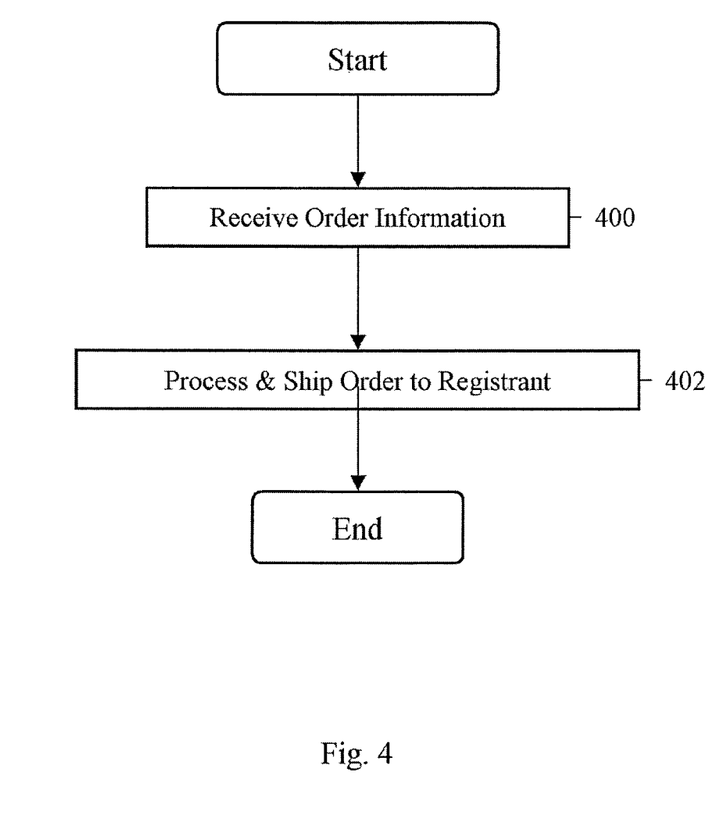
FIG. 4 is a flowchart of one embodiment of an order fulfillment process, in accordance with an aspect of the present invention.

FIG. 4 is a flowchart of one embodiment of an order fulfillment process, in accordance with an aspect of the present invention. The order fulfillment process begins with, or after the receipt of, order information from the registration system, e.g., STEP 320 at the merchandise supplier, STEP 400. The merchandise supplier then processes the order and ships the merchandise ordered by the registrant directly to the registrant and/or participant, STEP 402.

Described above is a capability of facilitating a registration and merchandise purchase by a registrant with an organization. More specifically, a registrant may register a participant for participation in one or more activities of an organization and simultaneously place a merchandise order. The payment for the registration and merchandise purchase is processed as a single shopping cart transaction, with payment being received by the organization. Meanwhile, a merchandise supplier ships the merchandise directly to the registrant or participant who registers the participant with the organization and who places the order for merchandise.

A further aspect of the present invention is a process through which the merchandise suppliers become compensated for the goods shipped to the participants. The process may correspond to a separate arrangement between the organization and the merchandise supplier. One embodiment of this aspect is described with respect to FIG. 5. In STEP 500, the registration system sends payment instructions to the merchandise supplier. Alternatively, the merchandise supplier may retrieve or extract payment instructions from the registration system, for instance in the case that the merchandise supplier is the provider of the registration system. The payment instructions may, for instance, represent a total quantity or value of merchandise orders fulfilled by the merchandise supplier during a particular timeframe. In one embodiment, the payment instructions are sent periodically, for example, daily or weekly, to the merchandise supplier. The payment instructions may optionally be derived or generated based on information stored in the registration database of the registration system, for instance from merchandise order information stored in the registration database of the registration system. The merchandise supplier then invoices the organization for compensation for goods shipped by the merchandise supplier, STEP 502. The invoice may comprise an invoice for goods ordered or shipped during a particular timeframe, for instance the timeframe corresponding to the payment instructions received from the registration system. At STEP 504, the organization compensates the merchandise supplier for the value of merchandise orders fulfilled by the merchandise supplier.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
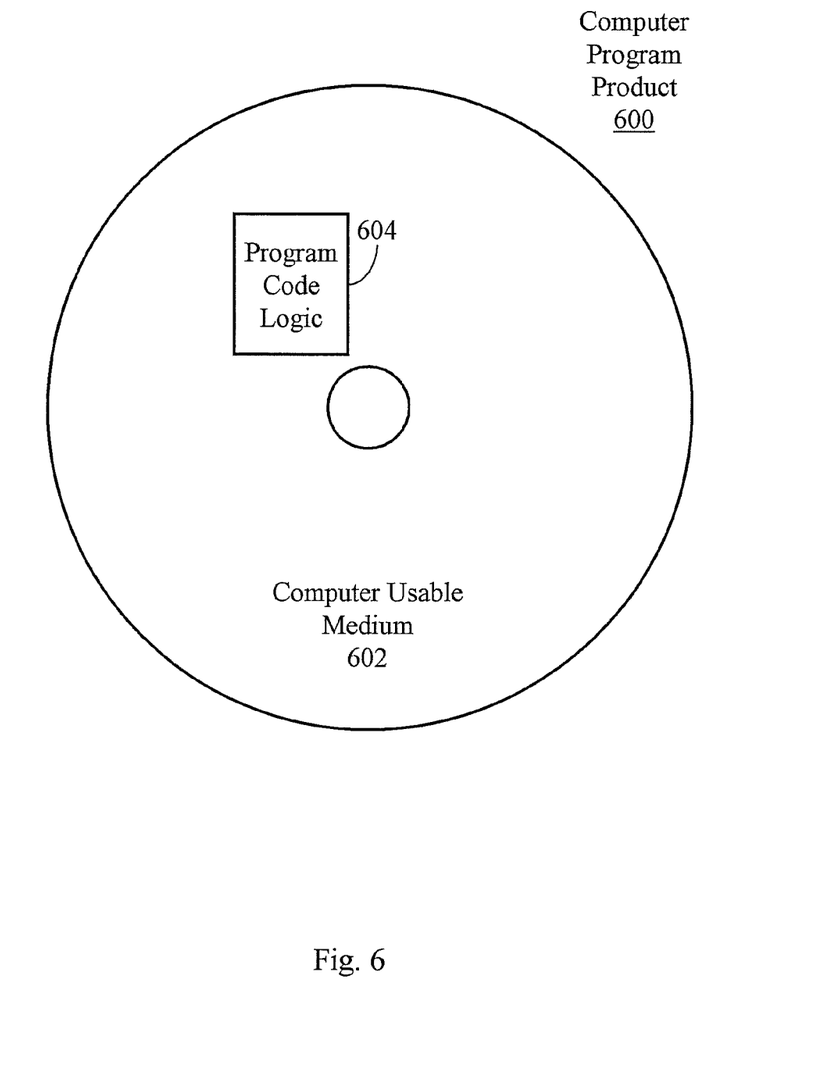
FIG. 6 depicts a representation one embodiment of a computer program product incorporating one or more aspects of the present invention.

Referring now to FIG. 6, in one example, a computer program product 600 includes, for instance, one or more computer readable storage media 602 to store computer readable program code means or logic 604 thereon to provide and facilitate one or more aspects of the present invention.

Computer readable program code embodied on a computer readable medium, for instance a computer program product of FIG. 6, may be transmitted using an appropriate medium, including but not limited to wireless, wireline, optical fiber cable, RF, etc., or any suitable combination of the foregoing. The computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. Some of the program code may execute on the participant's computer, as a stand-alone software package, for example, or within a web-browser. Some program code may execute partly on a local computer and partly on one or more remote computers, or entirely on one or more remote computers or servers. For example, some of the program code may execute on the participant's computer, some may execute on the registration system, and some may execute on a computer of the merchandise supplier. These are just examples; the locations of the execution of the program code may be anywhere including, but not limited to, the registration system, participant, organization, merchant account facility, bank account facility, and merchandise supplier, or at any combination thereof.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples, for compensation for management of customer environments.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be appreciated that a computer, as used within this disclosure, can be a general purpose computer, special purpose computer, or other programmable data processing apparatus to produce a machine, real or emulated on a host, such that instructions may execute via a processor of the computer or other programmable data processing apparatus to create means for implementing functions or acts specified. A non-limiting list of examples include personal computers (PCs), laptops, workstations, servers, computing terminals, PDAs, cellular telephones, and tablet computers.

A computer or data processing apparatus may be suitable for storing and/or executing program code and may include at least one processor coupled directly or indirectly to memory elements through a system bus. The memory elements may include, for instance, local memory employed during actual execution of the program code, bulk storage, and cache memory which provide temporary storage of at least some program code in order to reduce the number of times code must be retrieved from bulk storage during execution.

Further, the computer or data processing apparatus may include Input/Output or I/O devices (including, but not limited to, keyboards, displays, pointing devices, DASD, tape, CDs, DVDs, thumb drives and other memory media, etc.) which may be coupled to the system either directly or through intervening I/O controllers. Network adapters may also be coupled to the system to enable the data processing system to become coupled to other data processing systems or remote printers or storage devices through communication links including intervening private or public networks. Modems, cable modems, and Ethernet cards are just a few of the available types of network adapters.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical applications thereof, and to enable others of ordinary skill in the art to understand the invention's various embodiments with various modifications as are suited to the particular use contemplated.

What is claimed is:

1. A method comprising:
    based on a computer system of a registrant accessing a website presented to the registrant computer system by a registration system over an internet communications link, the registration system comprising memory, at least one processor, and a registration database, and the registration system having registration and merchandise purchase capabilities operable over the internet communications link, receiving from the registrant, by the registration system, via the website, a registration and a merchandise order, the merchandise order comprising a selection and identification, by the registrant, of merchandise from a set of merchandise available for ordering, the set of merchandise available for ordering being presented on the website and the selection and identification being made by the registrant via input to the website based on the presentation of the set of merchandise on the website, the registration for registering a participant in the registration database of the registration system to register the participant for participation in one or more activities of an organization, and the merchandise order for ordering, while the registering is performed, the selected and identified merchandise from a merchandise supplier, the merchandise supplier being a different entity than the organization, wherein the registration system receives the registration and the merchandise order as part of a single electronic shopping cart transaction, wherein the organization is a club or athletic organization, wherein the registration comprises registration to participate in gatherings of a group or team of the organization, and wherein the set of merchandise available for ordering includes at least one of a group comprising a pre-selected uniform or a pre-selected equipment of participants in the gatherings of the group or team of the organization;

receiving, by the registration system, via the website and over the internet communications link, payment information from the registrant, the payment information for processing a payment, the payment comprising a first portion for compensating the organization for the registration to participate in the one or more activities, and the payment further comprising a second portion for compensating the merchandise supplier for the merchandise order;

providing by the registration system over the internet communications link the payment information to a 3rd-party merchant processing facility of the organization for crediting an account of the organization with the payment for the registration and the merchandise order;

registering by the registration system the participant for participation in the one or more activities, the registering comprising writing to the registration database registration information regarding the participant;

transmitting, by the registration system, merchandise order information to the merchandise supplier over the internet communications link for merchandise order fulfillment, the merchandise order information including the selection and identification of the merchandise including a list of merchandise ordered as part of the single electronic shopping cart transaction, the transmitting the merchandise order information by the registration system automatically ordering for the registrant the selected and identified merchandise based on the single electronic shopping cart transaction, and the transmitting identifying, for the merchandise supplier, the merchandise ordered as part of the single electronic shopping cart transaction for shipment thereof directly to the registrant or participant, wherein the merchandise order fulfillment comprises shipping, by the merchandise supplier, the merchandise ordered as part of the single electronic shopping cart transaction directly to the registrant or participant; and periodically sending, by the registration system, payment instructions over the internet communications link to the merchandise supplier, wherein the payment instructions represent a total of merchandise orders fulfilled by the merchandise supplier during a period of time, wherein the merchandise supplier, responsive to the receipt of the payment instructions, presents an invoice of goods sold to the organization for reimbursement of merchandise orders fulfilled by the merchandise supplier, and wherein, as compensation for the merchandise orders fulfilled, the organization compensates the merchandise supplier through a separate arrangement between the merchandise supplier and the organization, wherein, as part of the separate arrangement, the second portion of the payment is provided to the merchandise supplier, wherein the registration system processes the single electronic shopping cart transaction as a single financial transaction comprising the payment.

2. The method of claim 1, wherein the method further comprises the registration system storing the merchandise order information to the registration database of the registration system.

3. The method of claim 1, further comprising receiving by the registration system one or more product data feeds from one or more merchandise suppliers over the internet communications link, wherein the received one or more product data feeds comprise updated merchandise information for presentation to participants registering for organization activities or purchasing merchandise, the updated merchandise information being for at least some of the set of merchandise from which the selection and identification of the merchandise that is part of the merchandise order is made by the registrant.

4. A registration system comprising:
a registration database;
a memory; and
at least one processor, in communications with the memory, wherein the registration system is configured to perform:
based on a computer system of a registrant accessing a website presented to the registrant computer system by the registration system over an internet communications link, the registration system having registration and merchandise purchase capabilities operable over the internet communications link, receiving from the registrant, by the registration system, via the website, a registration and a merchandise order, the merchandise order comprising a selection and identification, by the registrant, of merchandise from a set of merchandise available for ordering, the set of merchandise available for ordering being presented on the website and the selection and identification being made by the registrant via input to the website based on the presentation of the set of merchandise on the website, the registration for registering a participant in the registration database of the registration system to register the participant for participation in one or more activities of an organization, and the merchandise order for ordering, while the registering is performed, the selected and identified merchandise from a merchandise supplier, the merchandise supplier being a different entity than the organization, wherein the registration system receives the registration and the merchandise order as part of a single electronic shopping cart transaction, wherein the organization is a club or athletic organization, wherein the registration comprises registration to participate in gatherings of a group or team of the organization, and wherein the set of merchandise available for ordering includes at least one of a group comprising a pre-selected uniform or a pre-selected equipment of participants in the gatherings of the group or team of the organization;
receiving, by the registration system, via the website and over the internet communications link, payment information from the registrant, the payment information for processing a payment, the payment comprising a first portion for compensating the organization for the registration to participate in the one or more activities, and the payment further comprising a second portion for compensating the merchandise supplier for the merchandise order;
providing by the registration system over the internet communications link the payment information to a 3rd-party merchant processing facility of the organization for crediting an account of the organization with the payment for the registration and the merchandise order;
registering by the registration system the participant for participation in the one or more activities, the registering comprising writing to the registration database registration information regarding the participant;
transmitting, by the registration system, merchandise order information to the merchandise supplier over the internet communications link for merchandise order fulfillment, the merchandise order information including the selection and identification of the merchandise including a list of merchandise ordered as part of the single electronic shopping cart transaction, the transmitting the merchandise order information by the registration system automatically ordering for the registrant the selected and identified merchandise based on the single electronic shopping cart transaction, and the transmitting identifying, for the merchandise supplier, the merchandise ordered as part of the single electronic shopping cart transaction for shipment thereof directly to the registrant or participant, wherein the merchandise order fulfillment comprises shipping, by the merchandise supplier, the merchandise ordered as part of the single electronic shopping cart transaction directly to the registrant or participant; and
periodically sending, by the registration system, payment instructions over the internet communications link to the merchandise supplier, wherein the payment instructions represent a total of merchandise orders fulfilled by the merchandise supplier during a period of time, wherein the merchandise supplier, responsive to the receipt of the payment instructions, presents an invoice of goods sold to the organization for reimbursement of merchandise orders fulfilled by the merchandise supplier, and wherein, as compensation for the merchandise orders fulfilled, the organization compensates the merchandise supplier through a wherein, as part of the separate arrangement, the second portion of the payment is provided to the merchandise supplier;
wherein the registration system processes the single electronic shopping cart transaction as a single financial transaction comprising the payment.

5. A computer program product comprising:
a non-transitory storage medium readable by a processor and storing instructions for execution by the processor to perform:
based on a computer system of a registrant accessing a website presented to the registrant computer system by a registration system over an internet communications link, the registration system comprising memory, at least one processor, and a registration database, and the registration system having registration and merchandise purchase capabilities operable over the internet communications link, receiving from the registrant, by the registration system, via the website, a registration and a merchandise order, the merchandise order comprising a selection and identification, by the registrant, of merchandise from a set of merchandise available for ordering, the set of merchandise available for ordering being presented on the website and the selection and identification being made by the registrant via input to the website based on the presentation of the set of merchandise on the website, the registration for registering a participant in the registration database of the registration system to register the participant for participation in one or more activities of an organization, and the merchandise order for ordering, while the registering is performed, the selected and identified merchandise from a merchandise supplier, the merchandise supplier being a different entity than the organization, wherein the registration system receives the registration and the merchandise order as part of a single electronic shopping cart transaction, wherein the organization is a club or athletic organization, wherein the registration comprises registration to participate in gatherings of a group or team of the organization, and wherein the set of merchandise available for ordering includes at least one of a group comprising a pre-selected uniform or a pre-selected equipment of participants in the gatherings of the group or team of the organization;

receiving, by the registration system, via the website and over the internet communication link, payment information from the registrant, the payment information for processing a payment, the payment comprising a first portion for compensating the organization for the registration to participate in the one or more activities, and the payment further comprising a second portion for compensating the merchandise supplier for the merchandise order;

providing by the registration system over the internet communications link the payment information to a 3rd-party merchant processing facility of the organization for crediting an account of the organization with the payment for the registration and the merchandise order;

registering by the registration system the participant for participation in the one or more activities, the registering comprising writing to the registration database registration information regarding the participant;

transmitting, by the registration system, merchandise order information to the merchandise supplier over the internet communications link for merchandise order fulfillment, the merchandise order information including the selection and identification of the merchandise including a list of merchandise ordered as part of the single electronic shopping cart transaction, the transmitting the merchandise order information by the registration system automatically ordering for the registrant the selected and identified merchandise based on the single electronic shopping cart transaction, and the transmitting identifying, for the merchandise supplier, the merchandise ordered as part of the single electronic shopping cart transaction for shipment thereof directly to the registrant or participant, wherein the merchandise order fulfillment comprises shipping, by the merchandise supplier, the merchandise ordered as pan of the single electronic shopping cart transaction directly to the registrant or participant; and periodically sending, by the registration system, payment instructions over the internet communications link to the merchandise supplier, wherein the payment instructions represent a total of merchandise orders fulfilled by the merchandise supplier during a period of time, wherein the merchandise supplier, responsive to the receipt of the payment instructions, presents an invoice of goods sold to the organization for reimbursement of merchandise orders fulfilled by the merchandise supplier, and wherein, as compensation for the merchandise orders fulfilled, the organization compensates the merchandise supplier through a separate arrangement between the merchandise supplier and the organization, wherein, as part of the separate arrangement, the second portion of the payment is provided to the merchandise supplier;

wherein the registration system processes the single electronic shopping cart transaction as a single financial transaction comprising the payment.

6. The registration system of claim 4, wherein the registration system is further configured to perform storing the merchandise order information to the registration database of the registration system.

7. The computer program product of claim 5, wherein the instructions for execution by the processor are further to perform storing, by the registration system, the merchandise order information to the registration database of the registration system.

8. The registration system of claim 4, wherein the registration system is further configured to perform receiving one or more product data feeds from one or more merchandise suppliers over the internet communications link, wherein the received one or more product data feeds comprise updated merchandise information for presentation to participants registering for organization activities or purchasing merchandise, the updated merchandise information being for at least some of the set of merchandise from which the selection and identification of the merchandise that is part of the merchandise order is made by the registrant.

9. The computer program product of claim 5, wherein the instructions for execution by the processor are further to perform receiving by the registration system one or more product data feeds from one or more merchandise suppliers over the internet communications link, wherein the received one or more product data feeds comprise updated merchandise information for presentation to participants registering for organization activities or purchasing merchandise, the updated merchandise information being for at least some of the set of merchandise from which the selection and identification of the merchandise that is part of the merchandise order is made by the registrant.

\* \* \* \* \*

UNITED STATES PATENT AND TRADEMARK OFFICE
CERTIFICATE OF CORRECTION

PATENT NO. : 9,852,457 B2
APPLICATION NO. : 13/273661
DATED : December 26, 2017
INVENTOR(S) : Bruno et al.

It is certified that error appears in the above-identified patent and that said Letters Patent is hereby corrected as shown below:

In the Claims

Column 14, Line 44: Claim 4, Delete "through a wherein," and insert -- through a separate arrangement between the merchandise supplier and the organization, wherein, --

Signed and Sealed this
Thirteenth Day of February, 2018

Andrei Iancu
*Director of the United States Patent and Trademark Office*